(12) United States Patent
Taylor

(10) Patent No.: US 10,023,391 B2
(45) Date of Patent: Jul. 17, 2018

(54) CONVEYOR ASSEMBLY

(71) Applicant: TNA Australia Pty Limited, Lidcombe (AU)

(72) Inventor: Alfred Alexander Taylor, Lugarno (AU)

(73) Assignee: TNA Australia Pty Limited, Lidcombe, New South Wales (AU)

( * ) Notice: Subject to any disclaimer, the term of this patent is extended or adjusted under 35 U.S.C. 154(b) by 724 days.

(21) Appl. No.: 13/846,848

(22) Filed: Mar. 18, 2013

(65) Prior Publication Data

US 2013/0313078 A1    Nov. 28, 2013

(30) Foreign Application Priority Data

Mar. 19, 2012    (AU) .............................. 2012901097

(51) Int. Cl.
| | |
|---|---|
| *B65G 27/34* | (2006.01) |
| *B65G 25/04* | (2006.01) |
| *B65B 35/34* | (2006.01) |
| *B65G 47/72* | (2006.01) |

(Continued)

(52) U.S. Cl.
CPC ............... *B65G 25/04* (2013.01); *B65B 1/32* (2013.01); *B65B 35/34* (2013.01); *B65B 65/006* (2013.01); *B65G 27/34* (2013.01); *B65G 47/72* (2013.01); *B65B 2210/02* (2013.01); *B65B 2210/04* (2013.01)

(58) Field of Classification Search
CPC ........ A24C 5/35; B65G 47/647; B65G 47/78; B65G 27/34; B65G 37/10
USPC ...... 198/388, 621.1, 758, 753, 369.2, 369.5, 198/369.1, 750.1, 750.14, 752.1, 369.7
See application file for complete search history.

(56) References Cited

U.S. PATENT DOCUMENTS

| | | | |
|---|---|---|---|
| 6,848,568 B1 | 2/2005 | Nibler | |
| 7,475,767 B2 * | 1/2009 | Crawford et al. | ......... 198/369.7 |

(Continued)

FOREIGN PATENT DOCUMENTS

| | | | |
|---|---|---|---|
| CA | 1227165 A1 * | 3/1987 | |
| GB | 1013533 A | 12/1965 | |
| GB | 2490025 A | 10/2012 | |

(Continued)

OTHER PUBLICATIONS

Great Britain Search Report dated Jul. 25, 2013 in Application No. GB1303952.4.

(Continued)

*Primary Examiner* — Gene O Crawford
*Assistant Examiner* — Lester III Rushin
(74) *Attorney, Agent, or Firm* — Kilpatrick Townsend & Stockton LLP

(57) ABSTRACT

A slip conveyor (50) delivers product to a further conveyor (50) that in turn delivers product to weighing machines (53) that would be typically associated with a packaging machine. The slip conveyor (50) includes a delivery portion (57) provided with a plurality of separated fingers (59). Slots (58) between the fingers (59) extend longitudinally in the direction (52). Smaller product, such as smaller potato crisps, are located adjacent longitudinally extending edges (63) of the conveyor (10), the smaller product passes through the gaps (26a) that provides for delivery of product to the associated conveyor (62).

20 Claims, 5 Drawing Sheets

(51) Int. Cl.
    *B65B 65/00*      (2006.01)
    *B65B 1/32*       (2006.01)

(56) References Cited

U.S. PATENT DOCUMENTS 8,297,446 B2 * 10/2012 Spence, Jr. ............. B07B 13/07
                                                                209/675
2007/0108016 A1    5/2007  Eaton

FOREIGN PATENT DOCUMENTS

JP       2001-39527 A    2/2001
NL        1028406 C     8/2006

OTHER PUBLICATIONS

English translation of Notice of Reasons for Rejection from corresponding Japanese Patent Application 2013-048905 dated Aug. 23, 2016 (four pages).

* cited by examiner

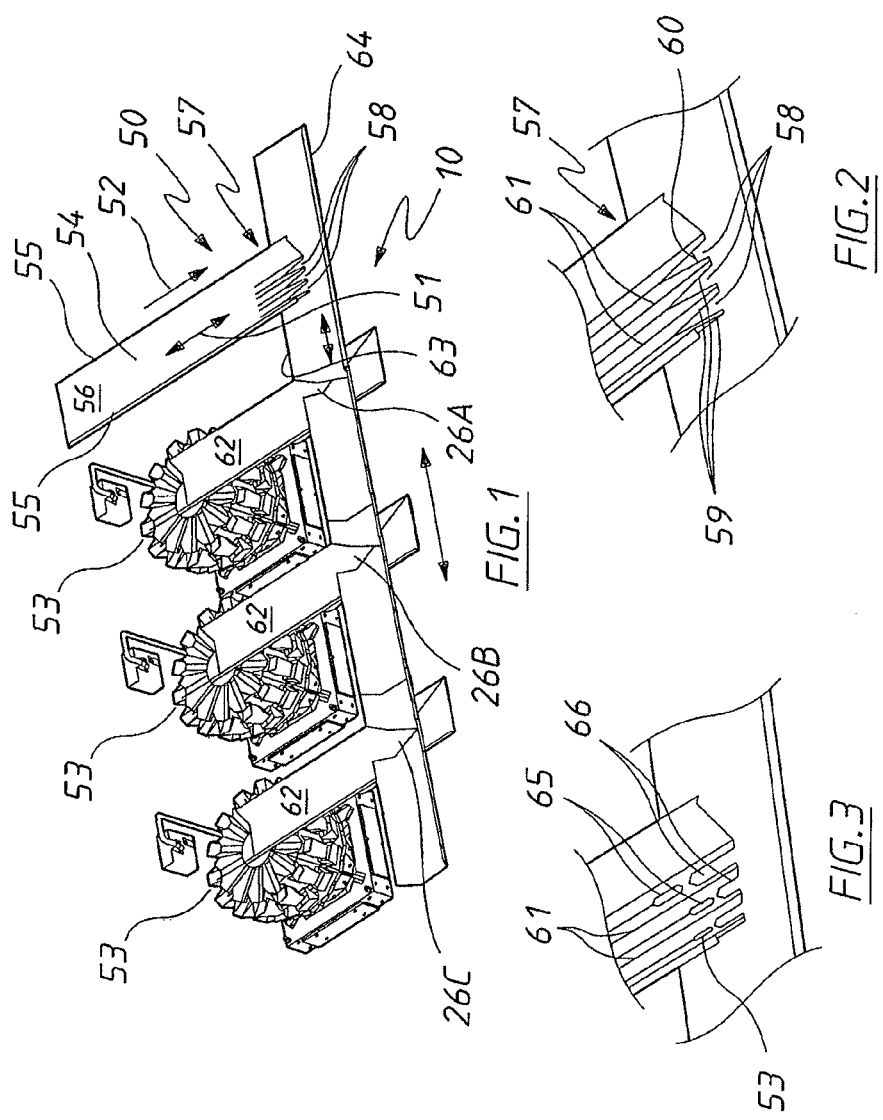

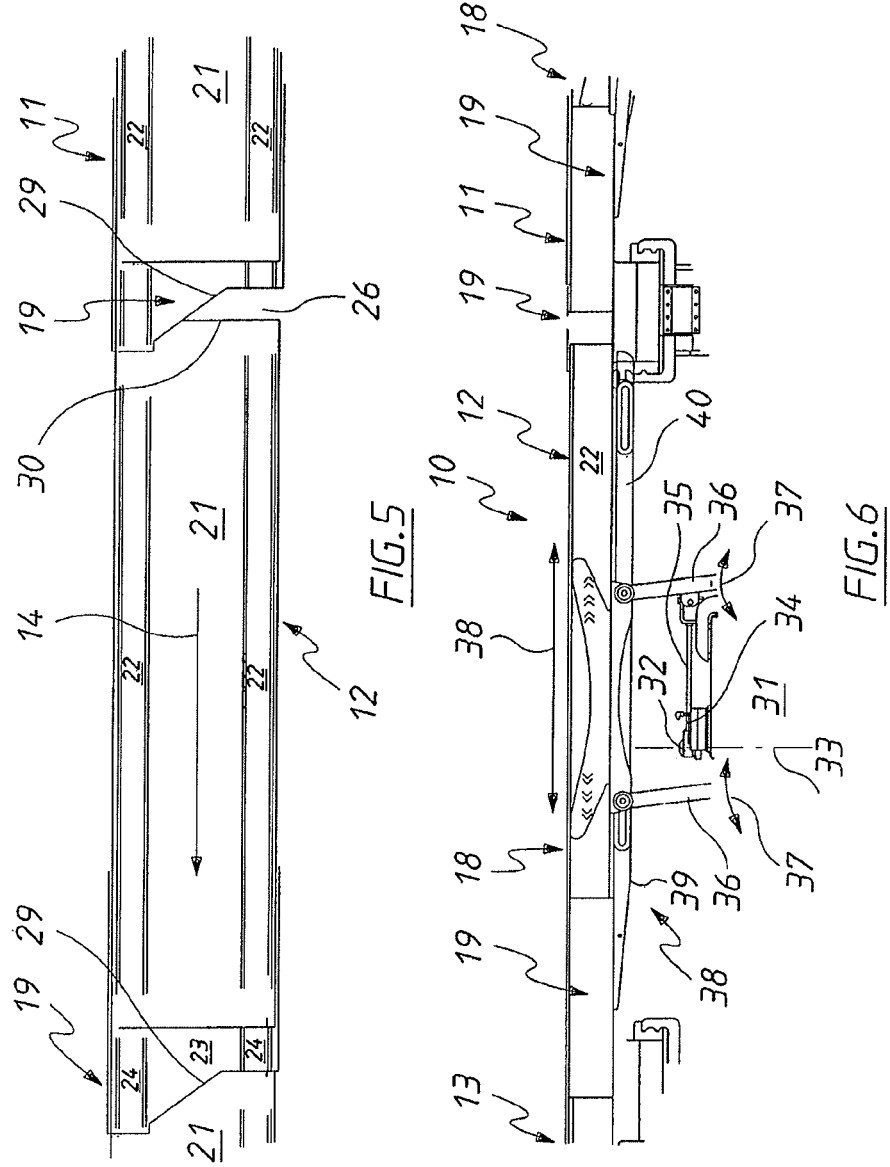

CONVEYOR ASSEMBLY

This application claims priority to the Australian Application No. 2012901097, filed Mar. 19, 2012, the disclosures of which are incorporated by reference herein.

FIELD

The present invention relates to conveyor assemblies and more particularly but not exclusively to conveyor assemblies that deliver product to be contained in bags.

BACKGROUND

In the packaging of snack foods the snack food is delivered to a weighing machine from where batches of the food are delivered to a packaging machine that forms the bags. Traditionally the bags have been of a single size. However more recently smaller bags have been formed and are known as a "single serve" bag. The smaller bags are contained in a larger bag for distribution. Accordingly bags of a number of different sizes are now produced.

Slip conveyors are used to deliver the snack food to the weighing machine, with the conveyor including longitudinally extending trays that are longitudinally vibrated (reciprocated) to transfer material along the conveyor. The longitudinal oscillation is rapid in one direction and slow in the other. The material is transported in the slow direction. Conveyors, including slip conveyors are described in U.S. Pat. No. 7,228,957 and U.S. patent application Ser. No. 11/108,052 (lodged on 14 Apr. 2005) and Ser. No. 11/263,762 (lodged on 31 Oct. 2205).

In the packaging industry, particularly the industry relating to the packaging of snack foods, product is delivered to a group of weighing machines, each of the weighing machines then communicates with an associated packaging machine such as the packaging machine described in U.S. Pat. No. 4,663,917. Conveyors, such as slip conveyors deliver the product to the weighing machines.

The above discussed arrangement for producing bags has the disadvantage that the packaging machines are set up to form only one particular size of bag. When a bag of a different size is to be produced, the machine needs to be altered, in particular the former needs to be replaced. This requires the packaging machines and associated conveyors to be shut down. Accordingly a further disadvantage is that production is interrupted.

OBJECT

It is the object of the present invention to overcome or substantially ameliorate at least one of the above disadvantages.

SUMMARY

There is disclosed herein a conveyor assembly including:
a first slip conveyor having a longitudinally extending conveyor surface along which product being conveyed moves in a downstream first direction longitudinally of the first conveyor;
a second slip conveyor, the second conveyor having a longitudinally extending conveyor surface along which the product being conveyed is moved in a downstream second direction longitudinally of the second conveyor, the second conveyor including a plurality of conveyor segments, the segments being arranged in series longitudinally of the second conveyor, the segments having end portions that cooperate to deliver product from the second conveyor; and wherein
the first conveyor has a delivery portion above an upstream portion of the second conveyor that extends transverse of the second conveyor, with the delivery portion having a plurality of slots extending longitudinally of the first conveyor, each slot having a transverse width, with the width of each slot increasing in said first direction, or the widths of the slots increasing in said first direction.

Preferably, each slot increases in transverse width in said direction so that each slot has a narrower upstream portion leading to a wider downstream portion.

In an alternative preferred form, the slots include upstream slots having a transverse width, and downstream slots having a transverse width greater than the transverse width of the upstream slots.

Preferably, the surface of the first conveyor has longitudinally extending troughs extending to the slots.

Preferably, said slots extend to an end extremity of the first conveyor.

Preferably, said first direction is generally normal to said second direction.

Preferably, said segments include:
a first conveyor tray having a first longitudinal surface upon which the product to be conveyed is supported;
a second conveyor tray, the second tray having a second longitudinally extending surface upon which the material to be conveyed is supported, with the second surface being positioned to receive the material from the first tray;
a drive assembly to cause longitudinal oscillation of each of the trays to convey the material in a predetermined direction; and wherein the first conveyor tray includes an end portion located adjacent the second conveyor tray with the end portion being movable relative to the second tray to provide a longitudinally extending gap between the first and second trays via which product is delivered from the assembly, the gap having an area of a desired size and having a longitudinal length and a transverse width, with said width being adjustable by movement of said end portion relative to the second tray to thereby alter the size of said area.

Preferably, said first tray includes a longitudinally extending base with said first conveyor tray end portion being operatively associated with the base for longitudinal movement relative thereto.

Preferably, said drive mechanism includes a first motor, the first motor causing longitudinal oscillation of said base and first conveyor tray end portion, and a second motor to cause longitudinal relative movement between the first conveyor tray end portion and the base.

Preferably, said base includes a longitudinally extending bottom wall providing the first surface, and a pair of longitudinally extending side walls, each side wall extending upwardly from the bottom wall so that the bottom wall is located therebetween, with said first conveyor tray end portion being nested with respect to said base.

In an alternative preferred form, the segments include:
a first conveyor tray having a first longitudinally extending surface on which matter to be conveyed is supported;
a second conveyor tray, the second conveyor tray having a second longitudinally extending surface, with the longitudinal surfaces being located so that material is conveyed from the first surface to the second surface;
a drive mechanism operatively associated with both trays to cause longitudinal oscillation thereof to cause the material to be conveyed along the surfaces in a predetermined direction; and wherein said first conveyor tray includes;
a longitudinally extending base,
a longitudinally extending end portion operatively associated with the base so as to be movable relative thereto, with the end portion being also movable relative to the second conveyor tray so as to be operable to provide a gap between the first and second trays via which product is delivered from the assembly.

Preferably, the longitudinally extending end portion is moved longitudinally relative to the base to provide said gap.

Preferably, said base includes a longitudinally extending bottom wall and a pair of longitudinally extending side walls extending upwardly from the bottom wall so that the bottom wall is located therebetween, and said longitudinally extending end portion is nested with respect to said base.

Preferably, said end longitudinally extending portion has a longitudinally extending end portion bottom wall with a leading edge extending generally transverse of said direction.

Preferably, said leading edge is generally linear and extends at an acute angle relative to said direction.

Preferably, said drive mechanism includes a first motor, said first motor being operatively associated with both trays to cause said longitudinal oscillation, and said drive mechanism includes a second motor, said second motor being operatively associated with said base and said end portion to cause relative movement therebetween.

BRIEF DESCRIPTION OF THE DRAWINGS

Preferred forms of the present invention will now be described by way of with reference to the accompanying drawings wherein:

FIG. 1 is a schematic isometric view of a conveyor assembly and a plurality of weighing machines that receive a product to be weighed and packaged;

FIG. 2 is a schematic isometric view of a portion of the conveyor assembly of FIG. 1;

FIG. 3 is a schematic isometric view of a modification of the conveyor portion of FIG. 2;

FIG. 5 is a schematic side elevation of the trays of the assembly of FIG. 4;

FIG. 6 is a schematic side elevation of portion of the assembly of FIG. 4;

DETAILED DESCRIPTION OF THE PREFERRED EMBODIMENTS

Figure 4:
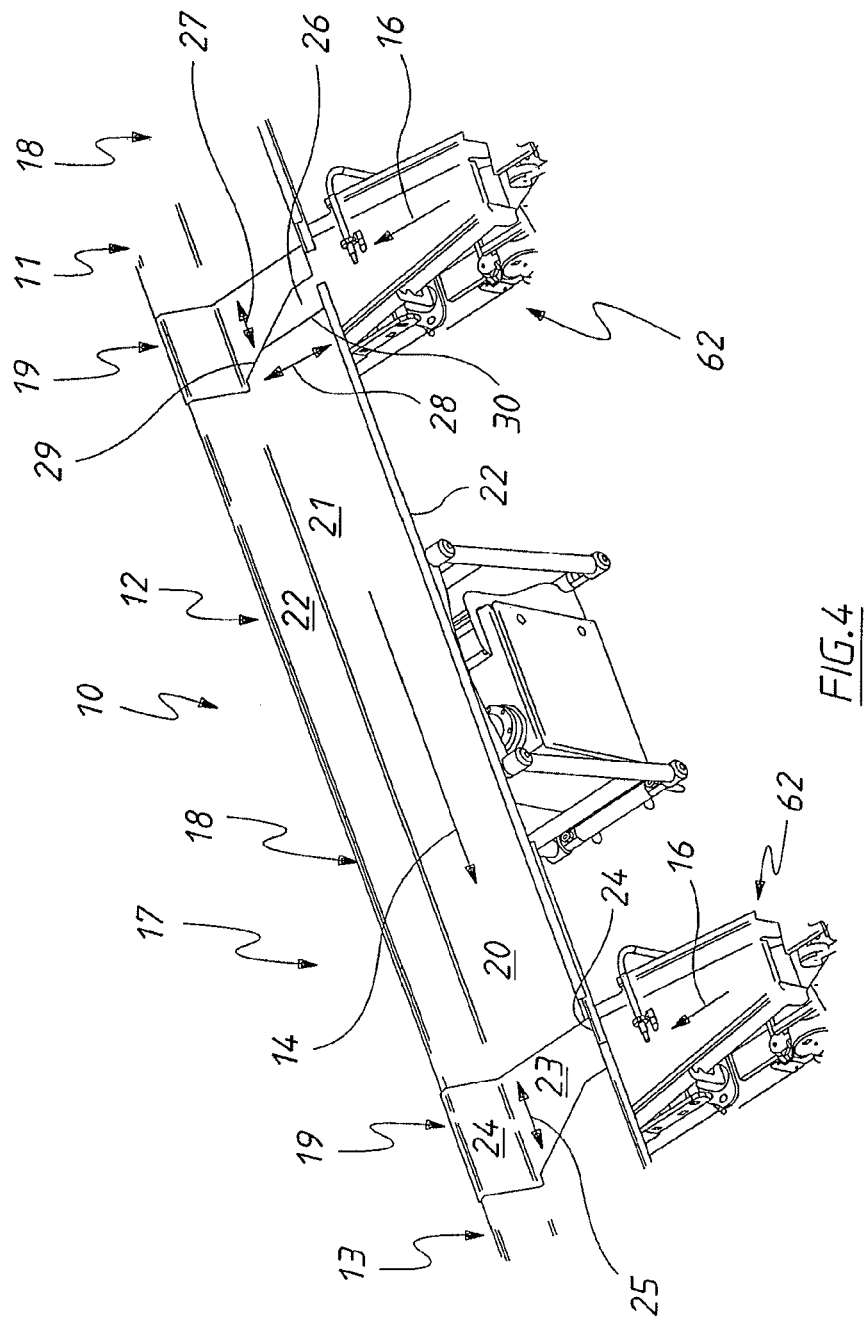
FIG. 4 is a schematic top isometric view of the slip conveyor assembly of FIG. 1.

In the accompanying drawings there is schematically depicted a slip conveyor assembly 10. The assembly 10 receives product (such as snack foods) to be packaged. Product is delivered to the conveyor assembly 10 by a slip conveyor 50. The slip conveyor 50 reciprocates linearly in the direction 51 to transport the product longitudinally of the conveyor 50 in the direction 52.

Product passing along the conveyor assembly 10 is delivered to weighing machines 53. Below each weighing machine is an associated packaging machine such as that disclosed in the abovementioned U.S. Pat. No. 4,663,917.

The slip conveyor 50 extends longitudinally in the direction 52 and has a floor upon which the product being conveyed rests, and from which there upwardly extends longitudinally extending sides 55. The sides 55 diverge upwardly from the floor 54. Accordingly the conveyor 50 is an elongated trough having an end wall 56 and a delivery portion 57.

At the delivery portion 57 the floor 54 is provided with a plurality of slots 58 that are separated by fingers 59. The slots 58 extend longitudinally in the direction 52 and have a transverse width 60. In the embodiment of FIG. 2, the transverse width 60 increases in the direction 52.

The end portion 57 is also provided with a plurality of longitudinally extending ridges 61 between which there are located troughs that direct the material to the slots 58.

In operation of the end portion 57 as shown in FIG. 2, the product, such as a snack food like potato crisps, moves down the floor 54 until the product engages the ridges 61. The product is then directed into the troughs and at the slots 58, with larger product travelling further along the end portion 57 than smaller product that will fall through the narrower part of the slots 60. Accordingly the product being conveyed by the conveyor 50 is distributed transversely across the conveyor assembly 10 with the product increasing in size transversely across the conveyor assembly 10 in the direction 52. That is, smaller product is located adjacent one side of the conveyor assembly 10 and the larger product located towards the other side of the conveyor assembly 10.

The conveyor 50 extends longitudinally generally normal relative to the conveyor assembly 10. Still further the end portion 57 is located above the conveyor assembly 10 so as to extend transversely thereacross.

As best seen in FIG. 1, the conveyor assembly 10 provides gaps 26a, 26b and 26c through which product is delivered to the slip conveyors 62, with each conveyor 62 being operatively associated with a respective one of the weighing machines 53.

As the smaller product (smaller potato crisps) is located adjacent longitudinal edge 63 of the conveyor assembly 10, the smaller product passes through the gap 26a that provides for the delivery of product to the associated conveyor 62. The next gap 26b delivers medium size material to the associated conveyor 62, while the furthest downstream gap 26c delivers the larger product to the associated conveyor 62, as the larger material is located adjacent the longitudinally extending edge portion 64 of the conveyor assembly 10.

In FIG. 3, there is schematically depicted a modification of the end portion 57. In this embodiment the slots 58 are replaced with a first set of slots 65 having a transverse width and extending longitudinally of the conveyor 50, and a second set of slots 66 which also extend longitudinally of the conveyor 50. The slots 65 and 66 are also located in the troughs separated by the ridges 61. In this particular embodiment the slots 65 are longitudinally aligned with the slots 66. Also in this embodiment, the slots 66 extend to the edge extremity of delivery portion 57.

Figure 7:
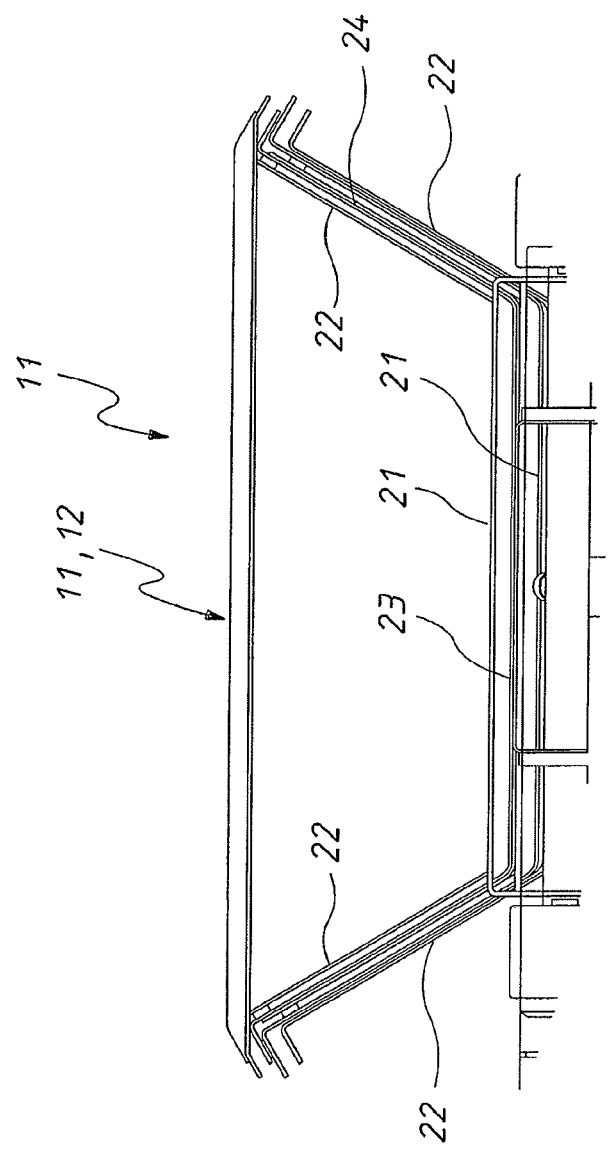
FIG. 7 is a schematic end elevation of portion of the trays of FIG. 3.
Figure 8:
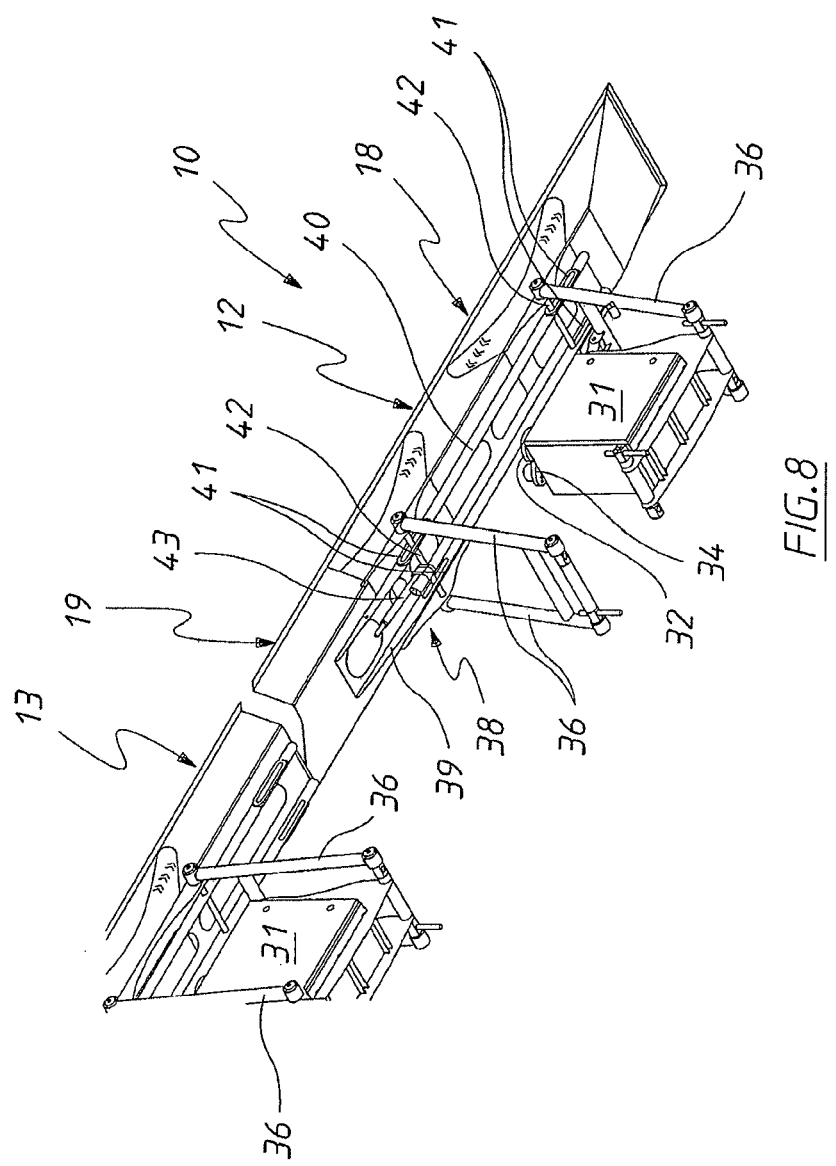
FIG. 8 is a schematic bottom isometric view of the assembly of FIG. 4.

In FIGS. 4 to 8 the accompanying drawings there is schematically depicted a slip conveyor assembly 10. The assembly 10 includes a plurality of conveyor trays (segments) 11, 12 and 13 that are operated to convey material in the direction 14. The bags 11, 12 and 13 provide segments. Located below the trays 11, 12 and 13 are transverse conveyors 62. Material being conveyed by the trays 11, 12 and 13 can be selectively delivered to the transverse conveyors 62 for delivery to the weighing and packaging machines. The conveyors 62 transport conveyed material in the direction 16. The conveyors 62 may also be slip conveyors.

Each of the conveyors 11, 12 and 13 includes a longitudinally extending tray 17 that includes a base 18 and an end portion 19. The base 18 and end portion 19 provide a longitudinally extending surface 20 upon which the material rests to be conveyed in the direction 14.

The base 18 includes a longitudinally extending bottom wall 21 and a pair of upwardly extending side walls 22. The side walls 22 are attached to the bottom wall 21 and diverge upwardly therefrom so that the wall 21 is located between the walls 22.

The end portion 19 also includes a bottom wall 23 and upwardly extending and diverging side walls 24. The end portion 19 is of a very similar configuration to the base 18 so that the end portion 19 is nested below the base 18 but is in slidable contact therewith so that the end portion 19 is movable relative to the base 18 in the longitudinal direction 25. The direction 25 is parallel to the direction 14.

The end portion 19, by being movable relative to its associated base 18, is also movable relative to the next adjacent tray 11, 12 or 13. As the end portion 19 is movable relative to the next downstream tray 11, 12 or 13, the end portion 19 is movable to create a gap 26. The end portion 19 of the conveyor 12 is moved forward in the direction 14 so that there is no gap between the conveyor 12 and the conveyor 13. However the end portion 19 of the conveyor 11 is retracted relative to its associated base 18 so that there exists the gap 26. The gap 26 has an area with a longitudinal length 27 and a transverse width 28. By moving the end portion 19 relative to its associated base, the size of the area of the gap 26 is adjustable by changing the transverse width of the area of the gap 26.

In the above described preferred embodiment, each end portion 19 has a leading edge 29 that is inclined to the direction 14 by an acute angle. Preferably, the edge 29 is linear. The next adjacent bottom wall 21 has a trailing edge 30 that is normal to the direction 14. However it should be appreciate the gap 26 could also be created by the edge 30 being inclined by an acute angle to the direction 14, and the edge 29 being normal to the direction 14.

In the above described preferred embodiment, the end portion 19 is at the downstream end of its associated base 18. However the above assembly 10 could also be configured so that the end portion 19 is at the upstream end of the base 18.

The tray 12 is linearly oscillated (reciprocated) by means of a motor and control assembly 31. The motor and control assembly 31 includes a crank shaft 32 that is rotated about the generally upright axis 33. Extending from the shaft 32 is a crank arm 34 that is attached to a link 35. The link 35 is pivotally attached to one of a pair of generally parallel linkages 36 that are caused to angularly oscillate in the direction 37. The upper ends of the linkages 36 are pivotally attached to the tray 12 so that the tray 12 is caused to oscillate (reciprocate) in the direction 38.

Each end portion 19 is supported by means of a carriage 38, the carriage 38 including a carriage base 39 to which the end portion 19 is attached. Extending from the carriage base 39 is a longitudinally extending carriage mounting 40 that has eyelets 41 slidably engaging transverse shafts 42 attaching the linkages 36 to the tray 12. Extending between one of the shafts 42 and the carriage base 39 is a motor 43 that causes linear movement of the end portion 19 in the direction 38 relative to the base 18. As an example, the motor 43 may be a pneumatic cylinder or a linear drive mechanism including a power screw and associated driven nut.

The motor and control assembly 31 also drives the end portion 19 as the end portion 19 is attached to the base 18.

Each of the trays 11, 12 and 13 has its associated drive mechanism including the motor and control mechanism 31 and motor 43 to drive its associated end portion 19.

An advantage of the above described preferred embodiment is that by movement of the end portion 19 relative to its associated base 18 the size of the gap 26 can be varied, in particular how far the gap 26 extends across the conveyor assembly 10.

As best seen in FIG. 1, the slot 26a only extends partly across the conveyor assembly 10, with the gap 26c extending almost entirely across the conveyor assembly 10.

The above described preferred embodiments have the advantage that each of the weighing machines 53 receives product of a desired size for inclusion in a particular sized bag. For example, the weighing machine 53 that receives product via the slot 26c could form large bags as it will receive the larger product, such as the larger potato crisps. This is in contrast to the weighing machine 53 that would receive the smaller product via the slot 26a.

The invention claimed is:

1. A conveyor assembly to convey product, the product having different sizes, the assembly comprising:
a first slip conveyor having a first longitudinally extending conveyor surface along which the product being conveyed moves in a first direction longitudinally of the first conveyor;
a second slip conveyor, the second conveyor having a second longitudinally extending conveyor surface along which the product being conveyed is moved in a second direction longitudinally of the second conveyor, the second conveyor including a plurality of conveyor segments, the segments being arranged in series longitudinally of the second conveyor, the segments having end portions being operable to provide a plurality of gaps through which product is delivered from the second conveyor, the gaps being arranged at spaced portions along the second conveyor; and wherein
the first conveyor has a delivery portion above an upstream portion of the second conveyor, that extends transverse of the second conveyor, with the delivery portion having a plurality of slots extending longitudinally of the first conveyor, each slot having a transverse width, with the width of each slot increasing in said first direction, or the widths of the slots increasing in said first direction, so that the product is distributed transversely of the second conveyor according to the product sizes, with the gaps configured to select product of a size to be delivered through each gap.

2. The conveyor assembly of claim 1, wherein each slot increases in transverse width in said direction so that each slot has a narrower upstream portion leading to a wider downstream portion.

3. The conveyor assembly of claim 1, wherein the slots include upstream slots having a transverse width, and downstream slots having a transverse width greater than the transverse width of the upstream slots.

4. The conveyor assembly of claim 1, wherein the first conveyor surface has longitudinally extending troughs extending to the slots.

5. The conveyor assembly of claim 1, wherein said slots extend to an end extremity of the first conveyor.

6. The conveyor assembly of claim 1, wherein said first direction is generally normal to said second direction.

7. The conveyor assembly of claim 1, wherein said segments include:

a first conveyor tray having a first longitudinal surface upon which the product to be conveyed is supported;

a second conveyor tray, the second tray having a second longitudinally extending surface upon which the material to be conveyed is supported, with the second surface being positioned to receive the material from the first tray;

a drive assembly to cause longitudinal oscillation of each of the trays to convey the material in the second direction; and wherein the first conveyor tray includes an end portion located adjacent the second conveyor tray with the end portion being movable relative to the second tray to provide a first one of the gaps between the first and second trays, the first gap having an area of a desired size and having a longitudinal length and a transverse width, with said width being adjustable by movement of said end portion relative to the second tray to thereby alter the size of said area.

8. The conveyor assembly of claim 7, wherein said first tray includes a longitudinally extending base with said first conveyor tray end portion being operatively associated with the base for longitudinal movement relative thereto.

9. The conveyor assembly of claim 8, wherein said drive mechanism includes a first motor, the first motor causing longitudinal oscillation of said base and first conveyor tray end portion, and a second motor to cause longitudinal relative movement between the first conveyor tray end portion and the base.

10. The conveyor assembly of claim 8, wherein said base includes a longitudinally extending bottom wall providing the first surface, and a pair of longitudinally extending side walls, each side wall extending upwardly from the bottom wall so that the bottom wall is located therebetween, with said first conveyor tray end portion being nested with respect to said base.

11. The conveyor assembly of claim 1, wherein the segments include:

a first conveyor tray having a first longitudinally extending surface on which the product is supported;

a second conveyor tray, the second conveyor tray having a second longitudinally extending surface, with the longitudinally extending surfaces being located so that the product is conveyed from the first longitudinally extending surface to the second longitudinally extending surface;

a drive mechanism operatively associated with both trays to cause longitudinal oscillation thereof to cause the material to be conveyed along the longitudinally extending surfaces in the second direction; and wherein said first conveyor tray includes;

a longitudinally extending base, a longitudinally extending end portion operatively associated with the base so as to be movable relative thereto, with the end portion being also movable relative to the second conveyor tray so as to be operable to provide a first one of the gaps between the first and second trays.

12. The conveyor assembly of claim 11, wherein the longitudinally extending end portion is moved longitudinally relative to the base to provide said first gap.

13. The conveyor assembly of claim 11, wherein said base includes a longitudinally extending bottom wall and a pair of longitudinally extending side walls extending upwardly from the bottom wall so that the bottom wall is located therebetween, and said longitudinally extending end portion is nested with respect to said base.

14. The conveyor assembly of claim 11, wherein said longitudinally extending end portion has a longitudinally extending end portion bottom wall with a leading edge extending generally transverse of said second direction.

15. The conveyor assembly of claim 14, wherein said leading edge is generally linear and extends at an acute angle relative to said direction.

16. The conveyor assembly of claim 7, wherein said first tray includes a longitudinally extending base with said first conveyor tray end portion being operatively associated with the base for longitudinal movement relative thereto, and said drive mechanism includes a first motor, said first motor being operatively associated with both trays to cause said longitudinal oscillation, and said drive mechanism includes a second motor, said second motor being operatively associated with said base and said end portion to cause relative movement therebetween.

17. The conveyor assembly of claim 2, wherein the slots include upstream slots having a transverse width, and downstream slots having a transverse width greater than the transverse width of the upstream slots.

18. The conveyor assembly of claim 17, wherein the surface of the first conveyor has longitudinally extending troughs extending to the slots.

19. The conveyor assembly of claim 18, wherein said slots extend to an end extremity of the first conveyor.

20. The conveyor assembly of claim 19, wherein said first direction is generally normal to said second direction.

\* \* \* \* \*